United States Patent Office 3,654,345
Patented Apr. 4, 1972

3,654,345
PREPARATION OF UNSATURATED ESTERS
Christian Robert Jentsch, Hamburg, Germany, assignor to The British Petroleum Company Limited, London, England
No Drawing. Filed May 21, 1969, Ser. No. 826,693
Claims priority, application Great Britain, June 17, 1968, 28,733/68
Int. Cl. C07c 69/54
U.S. Cl. 260—486 R    13 Claims

ABSTRACT OF THE DISCLOSURE

Methyl acrylate is prepared by reacting methanol with methyl acetate at elevated temperature in the presence of oxygen and a catalyst comprising silver or copper carried on an alumino-silicate support which has been treated with a base before the silver or copper is deposited.

---

This invention relates to a process for the production of unsaturated esters by a combined oxidation and aldolisation reaction.

Industrial and Engineering Chemistry, Product Research and Development Quarterly, volume 5, No. 1, March 1966, at page 50, discloses a vapour phase aldol reaction in which acetic acid is reacted with formaldehyde in the presence of several ion exchanged sodium aluminosilicates and impregnated silica gels.

U.S. Pat. 3,089,898 discloses a process for the preparation of methyl acrylate by reacting methyl acetate and formaldehyde with a zeolite catalyst.

Products produced by such processes are expensive, however, because of the high cost of the formaldehyde used.

Co-pending British application No. 06111/68 describes a process for the preparation of an unsaturated ester which process comprises reacting a primary alcohol of formula $RCH_2OH$, wherein R represents a hydrogen atom or a methyl group, with an ester of formula $CH_3COOR^1$ wherein $R^1$ represents a methyl or ethyl group, at elevated temperature in the presence of oxygen and a catalyst comprising silver or copper carried on a support which is an alumino-silicate substantially free from pores having a diameter smaller than 30 A.

In this process, the aldehyde is generated in situ by oxidation of the corresponding alcohol, which is generally considerably cheaper. This process, however, suffers from the disadvantage that much of the alcohol employed is dehydrated to an ether.

We have now surprisingly discovered that ether formation is considerably reduced if the alumino-silicate is impregnated with a base before silver or copper is deposited thereon. The treatment of the support with the base not only suppresses alcohol dehydrogenation but also activates the catalyst and space time yields for the unsaturated esters are improved.

According to the present invention, there is provided a process for the preparation of methyl acrylate which process comprises reacting methanol with methyl acetate at elevated temperature in the presence of oxygen and a catalyst comprising silver or copper carried on an alumino-silicate support which has been treated with a base before the silver or copper is deposited thereon.

Suitable alumino silicates are those containing alkali metal ions, alkaline earth metal ions and ions of certain heavy metals such as manganese, cobalt, zinc and lead.

Very suitable supports are Permutit G, a sodium alumino-silicate sold by Permutit A.G., Berlin, and alumino-silicates derived from it by ion exchange.

The mechanical properties of the catalyst can be improved by roasting the support before treating it with a base.

Suitable bases include the hydroxides and carbonates of the alkali metals. Preferably the cation of the base is the same as the cation of the support.

The support is conveniently treated with the base by dispersing the former in an aqueous solution of the latter and evaporating the resulting dispersion to dryness.

Alternatively the support may be treated by contacting it with dilute aqueous alkali, filtering, washing and drying. In this way the acid sites originally present in the support are neutralized without massive impregnation.

Suitably the added basic content of the support is in amount up to 5% expressed as percent by weight of the support.

The reaction is suitably effected at a temperature in the range 350° C. to 500° C., preferably 375° C. to 425° C.

A suitable source of oxygen is air.

The molar ratio of the methanol to the methyl acetate is suitably in the range 6:1 to 1:1, preferably 5:1 to 3:1.

The methanol is preferably used in excess in order to achieve better utilisation of the ester and to inhibit saponification.

The molar ratio of oxygen to the alcohol is suitably in the range 1:3 to 1:30, preferably 1:8 to 1:18.

Suitably the reactants are passed over the catalyst at a total GHSV (Gallons Per Hour Space Velocity) in the range 200 to 1500.

The preferred metal is silver.

In use the activity of the catalyst declines in time. The catalyst may be regenerated by passing air through it at a temperature in the range over which the oxidation/aldolisation reaction is effected.

The catalyst may be prepared by mixing a solution of a compound of the silver or copper with an alkaline solution, recovering the precipitated Group Ib metal compound, and dispersing the compound, whilst still in a moist condition over the surface of the base treated aluminosilicate, suitably in a rotary evaporator. The catalyst precursor is then dried, and the silver or copper compound reduced to the corresponding metal, for example, by heating in an inert atmosphere in the case of silver or by heating in a reducing atmosphere in the case of copper.

The invention is illustrated by the following examples. It should be noted that Example 1 is provided for purposes of comparison only and does not illustrate a process according to the present invention.

EXAMPLE 1

Permutit G was heated in a chamber furnace at 750° C. for 1 hour.

2.36 g. $AgNO_3$ were dissolved in 20 ml. water and stirred into a solution of 0.6 g. NaOH in 20 ml. water. The precipitated $Ag_2O$ was well washed and applied while still in a moist condition to 50 g. pre-treated Permutit in a rotary evaporator. The catalyst was dried and heated to 300° C. in a current of nitrogen for 3 hours to decompose the $Ag_2O$. The resulting catalyst contained 1.2% by weight Ag.

A reaction tube was filled with 50 ml. of the catalyst and heated to 400° C. in a salt bath. 32.5 g. of a mixture containing methanol and methyl acetate in a molar ratio of 6:2 and 5.35:1 air were passed through the tube over a period of 1 hour. The reaction products were condensed and analysed by gas chromatography.

Methyl acetate had been converted at a rate of 25%. Selectivity for methyl acrylate based on methyl acetate converted was 54%, for acetic acid 13% and for acrolein 3%. Selectivity for methyl acrylate based on methanol was 14%.

EXAMPLE 2

Permutit G was heated in a chamber furnace at 750° C. for 1 hour. 0.5 g. NaOH dissolved in 50 ml. water were applied to 50 g. of the pre-treated Permutit in a rotary evaporation.

2.36 g. $AgNO_3$ were dissolved in 20 ml. water and stirred into a solution of 0.6 g. NaOH in 20 ml. water. The precipitated $Ag_2O$ was well washed and applied while still in a moist condition to the thermally treated, base-impregnated Permutit in a rotary evaporator. The catalyst was dried and heated to 300° C. in a current of nitrogen for 3 hours to decompose the $Ag_2O$. The resulting catalyst contained 1.4% by weight Ag.

A reaction tube was filled with 30 ml. of the catalyst and heated to 400° C. in a salt bath. 26.0 g. of a mixture containing methanol and methyl acetate in a molar ratio of 6:2 and 4.3:1 air were passed through the tube over a period of 1 hour. The reaction products were condensed and analysed by gas chromatography.

Methyl acetate has been converted at a rate of 24%. Selectivity for methyl acrylate based on methyl acetate was 54%, for acetic acid 6% and for acrolein 4%. Selectivity for methyl acrylate based on methanol was 35%.

EXAMPLE 3

Permutit G was heated in a chamber furnace at 700° C. for 3 hours.

0.5 g. NaOH dissolved in 50 ml. water were applied to 50 g. of the pre-treated Permutit in a rotary evaporator.

7.08 g. $AgNO_3$ were dissolved in 50 ml. water and stirred into a solution of 1.8 g. NaOH in 50 ml. water. The precipitated $Ag_2O$ was well washed and applied while still in a moist condition to the thermally treated, base-impregnated Permutit in a rotary evaporator. The catalyst was dried and heated to 300° C. in a current of nitrogen for 3 hours to decompose the $Ag_2O$. The resulting catalyst contained 3.7% by weight Ag.

A reaction tube was filled with 30 ml. of the catalyst and heated to 400° C. in a salt bath. 39.1 g. of mixture containing methanol and methyl acetate in a molar ratio of 6:2 and 4.3:1 air were passed through the tube over a period of 1 hour. The reaction products were condensed and analysed by gas chromatography.

Methyl acetate had been converted at a rate of 23%. Selectivity for methyl acrylate based on methyl acetate converted was 61%, for acetic acid 7% and for acrolein 5%. Selectivity for methyl acrylate based on methanol converted was 40%.

EXAMPLE 4

Permutit G was ion exchanged with a 10% KCl solution. After washing with water and drying, the resulting K-Permutit was heated in a chamber furnace at 800° C. for 2 hours.

0.5 g. $K_2CO_3$ dissolved in 50 ml. water were applied to 50 g. of the pre-treated K-Permutit in a rotary evaporator.

2.36 g. $AgNO_3$ dissolved in 20 ml. water and stirred into a solution of 0.6 g. NaOH in 20 ml. water. The precipitated $Ag_2O$ was well washed and applied while still in a moist condition to the thermally treated, base-impregnated K-Permutit in a rotary evaporator. The catalyst was dried and heated to 300° C. in a current of nitrogen for 3 hours to decompose the $Ag_2O$. The resulting catalyst contained 1.7% by weight Ag.

A reaction tube was filled with 30 ml. of the catalyst and heated to 40° C. in a salt bath. 39.1 g. of a mixture containing methanol and methyl acetate in a molar ratio of 6:2 and 6.4:1 air were passed through the tube over a period of 1 hour. The reaction products were condensed and analysed by gas chromatography.

Methyl acetate had been converted at a rate of 28%. Selectivity for methyl acrylate based on methyl acetate converted was 54%, for acetic acid 4% and for acrolein 2%. Selectivity for methyl acrylate based on methanol converted was 60%.

EXAMPLE 5

Permutit G was ion exchanged with a 10% KCl solution, washed thoroughly and dried. 50 g. of the resulting K-Permutit was agitated for 30 minutes with a solution of 1 g. KOH in 250 ml. water. The solution was then decanted off and the solid material was washed twice with water.

Silver was then deported on the resulting support by the method described in Example 4. The resulting catalyst contained 1.4% Ag.

A reaction tube was filled with 30 ml. of the catalyst and heated to 400° C. in a salt bath. 39.0 g. of a mixture containing methanol and methyl acetate in a molar ratio of 8:2 and 5.4:1 air were passed through the tube over a period of 1 hour. The reaction products were condensed and analysed by gas chromatography.

Methyl acetate had been converted at a rate of 25%. Selectivity for methyl acrylate based on methyl acetate converted was 67%, for acetic acid 4% and for acrolein less than 1%. Selectivity for methyl acrylate based on methanol converted was 48%.

What I claim is:

1. A process for the preparation of methyl acrylate which process comprises reacting methanol with methyl acetate at elevated temperature with range 350° C. to 500° C. in the presence of oxygen and a catalyst consisting of silver or copper carried on an aluminosilicate support which has been treated with a base before the silver or copper is deposited thereon.

2. A process according to claim 1 wherein the aluminosilicate is selected from those containing alkali metal ions.

3. A process according to claim 1 wherein the aluminosilicate is selected from those containing alkaline earth metal ions or ions of manganese, cobalt, zinc and lead.

4. A process according to claim 1 wherein the support is roasted before treatment with the base.

5. A process according to claim 1 wherein the base is a hydroxide or carbonate of an alkali metal.

6. A process according to claim 5 wherein the cation of the base is the same as the cation of the support.

7. A process according to claim 1 wherein the added basic content of the support is in amount up to 5% expressed as a percent by weight of the support.

8. A process according to claim 1 wherein the reaction is effected at a temperature in the range 375° C. to 425° C.

9. A process according to claim 1 wherein the molar ratio of methanol to methyl acetate is in the range 6:1 to 1:1.

10. A process according to claim 10 wherein the molar ratio is in the range 5:1 to 3:1.

11. A process according to claim 1 wherein the molar ratio of oxygen to the alcohol is in the range 1:3 to 1:30.

12. A process according to claim 11 wherein the ratio is in the range 1:8 to 1:18.

13. A process according to claim 1 wherein the reactants are passed over the catalyst at a total GHSV in the range 200 to 1500.

References Cited

UNITED STATES PATENTS 2,734,074   2/1956   Redmon _____ 260—486

OTHER REFERENCES

Groggins: Unit Processes in Organic Synthesis, 5th ed., 1968, p. 518.

JAMES A. PATTEN, Primary Examiner

P. J KILLOS, Assistant Examiner

U.S. Cl. X.R.

252—454; 260—486 D

UNITED STATES PATENT OFFICE
CERTIFICATE OF CORRECTION

Patent No. 3,654,345     Dated April 4, 1972

Inventor(x)  Christian Robert Jentsch

It is certified that error appears in the above-identified patent and that said Letters Patent are hereby corrected as shown below:

Col. 3, Line 40,
for "39.1 g. of mixture"     read     -- 26.0 g. of a mixture --

Col. 3, Line 66,
for "40°C"     read     -- 400°C --

Col. 4, Line 52,
for "claim 10"     read     -- claim 9 --

Signed and sealed this 5th day of December 1972.

(SEAL)
Attest:

EDWARD M. FLETCHER, JR.
Attesting Officer

ROBERT GOTTSCHALK
Commissioner of Patents